United States Patent
Hori

(10) Patent No.: US 11,961,152 B2
(45) Date of Patent: Apr. 16, 2024

(54) ORDER MANAGEMENT SERVER, ORDER MANAGEMENT PROGRAM, ORDER MANAGEMENT METHOD, INFORMATION PROCESSING SERVER, INFORMATION PROCESSING PROGRAM, AND INFORMATION PROCESSING METHOD

(71) Applicant: HORIKEN CO. LTD., Ibaraki (JP)

(72) Inventor: Mineya Hori, Tokyo (JP)

(73) Assignee: HORIKEN CO. LTD., Ibaraki (JP)

( * ) Notice: Subject to any disclaimer, the term of this patent is extended or adjusted under 35 U.S.C. 154(b) by 0 days.

(21) Appl. No.: 18/326,232

(22) Filed: May 31, 2023

(65) Prior Publication Data

US 2023/0306537 A1 Sep. 28, 2023

Related U.S. Application Data

(63) Continuation of application No. PCT/JP2022/018646, filed on Apr. 24, 2022.

(30) Foreign Application Priority Data

Jun. 29, 2021 (JP) .................. 2021-108095

(51) Int. Cl.
*G06Q 30/00* (2023.01)
*G06Q 20/10* (2012.01)
*G06Q 50/08* (2012.01)

(52) U.S. Cl.
CPC ........... *G06Q 50/08* (2013.01); *G06Q 20/102* (2013.01)

(58) Field of Classification Search
CPC ............................. G06Q 50/08; G06Q 20/102
See application file for complete search history.

(56) References Cited

U.S. PATENT DOCUMENTS 7,305,392 B1 * 12/2007 Abrams ................. G06Q 10/10
707/999.009
2002/0019757 A1 * 2/2002 Dodt .................... G06Q 10/063
705/7.11

(Continued)

FOREIGN PATENT DOCUMENTS

| JP | 2017-162297 A | 9/2017 |
| JP | 2019-040508 A | 3/2019 |
| JP | 2020-521224 A | 7/2020 |

OTHER PUBLICATIONS

"Stratify Legal Discovery(TM) 7.0 Delivers Enhanced High Performance eDiscovery; Only Solution to Combine Scalability, Reliability, and Innovative Technologies to Improve eDiscovery Processes," PR Newswire [New York] Jan. 24, 2007; Dialog #451048392, 3pgs. (Year: 2007).*

*Primary Examiner* — Robert M Pond
(74) *Attorney, Agent, or Firm* — WC&F IP

(57) ABSTRACT

Provided are a server connected to a first terminal operated by an orderer, a second terminal operated by a recipient that accepts an order, and a third terminal operated by a third party. The server includes: a first receiver configured to receive, from the first terminal, an order content indicating a content of the order; a first creating unit configured to create a work order, based on the order content; a first viewing controller configured to display the work order on the second terminal; a second receiver configured to receive, from the second terminal, acknowledgement information indicating acceptance of the order; a second creating unit configured to create a written acknowledgement for the accepted order, based on the acknowledgement information; and a second viewing controller configured to display the written acknowledgement on the third terminal in such a manner that a part of the order content is invisible.

8 Claims, 17 Drawing Sheets

---

ORDER-ACKNOWLEDGEMENT CONFIRMATION SCREEN P5

SELECT A CONSTRUCTION THE ORDER ACKNOWLEDGEMENT OF WHICH YOU WANT TO CONFIRM.

YAMAZAKI RESIDENCE NEW CONSTRUCTION

... CONSTRUCTION

CONFIRM WRITTEN ACKNOWLEDGEMENT B5

(56) References Cited

U.S. PATENT DOCUMENTS

| | | | |
|---|---|---|---|
| 2010/0031226 A1* | 2/2010 | Chaar | G06Q 10/06 717/101 |
| 2014/0067575 A1* | 3/2014 | Nevada | G06Q 20/20 705/26.1 |
| 2018/0150440 A1* | 5/2018 | Keuffer | G06F 21/6245 |
| 2020/0151670 A1 | 5/2020 | Chen | |

* cited by examiner

| USER ID | NAME | NAME OF PERSON IN CHARGE | E-MAIL ADDRESS | ... |
|---|---|---|---|---|
| A | A BUILDER CORPORATION | KOUMU TARO | a@domain | ... |
| B | B FACILITIES CORPORATION | SETSUBI JIRO | b@domain | ... |
| C | C GAS LTD. | GASU SABURO | c@domain | ... |
| D1 | D1 ELECTRIC LTD. | DENKI SHIRO | d1@domain | ... |
| ... | ... | ... | ... | ... |

FIG. 4

| CONSTRUCTION ID | NAME | ADDRESS | ... |
|---|---|---|---|
| W1 | YAMAZAKI RESIDENCE NEW CONSTRUCTION | MIE PREFECTURE, SHIMA CITY | ... |
| ... | ... | ... | ... |

FIG. 5

| ORDER ID | CONSTRUCTION ID | USER ID OF ORDERER | USER ID OF ORDER RECIPIENT | ORDER CONTENT | ... |
|---|---|---|---|---|---|
| Q1 | W1 | A | B | ... | ... |
| Q2 | W1 | B | C | ... | ... |
| Q3 | W1 | C | D1 | ... | ... |
| Q4 | W1 | C | D2 | ... | ... |
| ... | ... | ... | ... | ... | ... |

FIG. 6

| ORDER RECEPTION ID | ORDER ID | NAME OF COMPANY WHICH ACCEPTS ORDER (SIGNATURE) | PERSON IN CHARGE WHICH ACCEPTS ORDER (SIGNATURE) | ... |
|---|---|---|---|---|
| R1 | Q1 | B FACILITIES CORPORATION | SETSUBI JIRO | ... |
| R2 | Q2 | C GAS LTD. | GASU SABURO | |
| R3 | Q3 | D1 ELECTRIC LTD. | DENKI SHIRO | |
| R4 | Q4 | ... | ... | |
| ... | ... | ... | ... | ... |

FIG. 7

WORK ORDER

ORDER ID : Q2

ISSUE DATE: 26 JUNE 2021

(ORDER RECIPIENT)

C GAS LTD.

MR. GASU SABURO (ORDERER)

B FACILITIES CORPORATION

SETSUBI JIRO

WE HAVE PLACED AN ORDER AS FOLLOWS.

PLEASE SUBMIT "ORDER ACKNOWLEDGEMENT"

WHEN YOU UNDERTAKE THE ORDER.

CONSTRUCTION NAME: YAMAZAKI RESIDENCE NEW CONSTRUCTION

CONSTRUCTION LOCATION: MIE PREFECTURE, SHIMA CITY

CONSTRUCTION PERIOD: FROM 1 AUGUST 2021 TO 20 DECEMBER 2021

ORDER AMOUNT: ¥1,650,000 YEN (BREAKDOWN)

... CONSTRUCTION: ¥... YEN

... CONSTRUCTION: ¥... YEN

ORDER ACKNOWLEDGEMENT

ORDER ID : Q2

ISSUE DATE: 26 JUNE 2021

(ORDERER)

B FACILITIES CORPORATION

Mr. SETSUBI JIRO (ORDER RECIPIENT)

C GAS LTD.

GASU SABURO

WE WILL UNDERTAKE THE ORDER AS FOLLOWS.

CONSTRUCTION NAME: YAMAZAKI RESIDENCE NEW CONSTRUCTION

CONSTRUCTION LOCATION: MIE PREFECTURE, SHIMA CITY

CONSTRUCTION PERIOD: FROM 1 AUGUST 2021 TO 20 DECEMBER 2021

ORDER AMOUNT: ¥1,650,000 YEN (BREAKDOWN)

... CONSTRUCTION: ¥... YEN

... CONSTRUCTION: ¥... YEN

. . .

| COMPANY NAME | NAME OF PERSON IN CHARGE |
|---|---|
| C GAS LTD. | GASU SABURO |

FIG. 9

USER-INFORMATION REGISTRATION SCREEN P1

INPUT USER INFORMATION.

| NAME | A BUILDER CORPORATION |
| NAME OF PERSON IN CHARGE | KOUMU TARO |
| E-MAIL ADDRESS | a@domain |
| . . . | . . . |

REGISTER B1

FIG. 12

CONSTRUCTION-INFORMATION REGISTRATION SCREEN P2

INPUT CONSTRUCTION INFORMATION.

| | |
|---|---|
| CONSTRUCTION NAME | YAMAZAKI RESIDENCE NEW CONSTRUCTION |
| CONSTRUCTION LOCATION | MIE PREFECTURE, SHIMA CITY |
| CONSTRUCTION PERIOD | FROM  1 AUGUST 2021 |
| | TO  20 DECEMBER 2021 |
| . . . | . . . |

REGISTER B2

FIG. 13

ORDER-CONTENT REGISTRATION SCREEN P3

INPUT ORDER CONTENTS.

| ORDERER | B FACILITIES CORPORATION ▼ |
| --- | --- |
| ORDER RECIPIENT | C GAS LTD. ▼ |
| CONSTRUCTION NAME | YAMAZAKI RESIDENCE NEW CONSTRUCTION ▼ |
| ORDER AMOUNT | ¥1,650,000 YEN |
| (BREAKDOWN) | ... CONSTRUCTION    ¥... YEN |
|  | ... CONSTRUCTION    ¥... YEN |

. . .

REGISTER B3

FIG. 14

WORK-ORDER CONFIRMATION SCREEN P41

SELECT A WORK ORDER YOU WANT TO CONFIRM.

| YAMAZAKI RESIDENCE NEW CONSTRUCTION | ✓ |
| ... CONSTRUCTION | ☐ |

CONFIRM WORK ORDER B41a

REGISTER ACCEPTANCE B41b

FIG. 15

ACKNOWLEDGEMENT-INFORMATION REGISTRATION SCREEN P42

REGISTER SIGNATURE AS ACKNOWLEDGEMENT INFORMATION
IF NO PROBLEM IS FOUND IN THE CONTENTS OF THE WORK ORDER.

COMPANY NAME

C GAS LTD.

SIGNATURE FOR ACCEPTANCE

GASU SABURO

REGISTER B42

FIG. 16

ORDER-ACKNOWLEDGEMENT CONFIRMATION SCREEN P5

SELECT A CONSTRUCTION THE ORDER ACKNOWLEDGEMENT OF WHICH YOU WANT TO CONFIRM.

| YAMAZAKI RESIDENCE NEW CONSTRUCTION | ✓ |
| --- | --- |
| ... CONSTRUCTION | ☐ |

CONFIRM WRITTEN ACKNOWLEDGEMENT B5

FIG. 17

ORDER-LIST SELECTION SCREEN P61

SELECT A CONSTRUCTION THE ORDER ACKNOWLEDGEMENT OF WHICH YOU WANT TO CONFIRM.

| YAMAZAKI RESIDENCE NEW CONSTRUCTION | ✓ |
| --- | --- |
| ... CONSTRUCTION | ☐ |

CONFIRM LIST B61

FIG. 18

ORDER-LIST VIEWING SCREEN P62

SELECT AN ORDER THE WRITTEN ACKNOWLEDGEMENT OF WHICH YOU WANT TO CONFIRM.

| ORDERER | ORDER RECIPIENT | |
|---|---|---|
| A BUILDER CORPORATION | B FACILITIES CORPORATION | ☐ |
| B FACILITIES CORPORATION | C GAS LTD. | ✓ |
| C GAS LTD. | D1 ELECTRIC LTD. | ☐ |
| . . . | . . . | ☐ |

CONFIRM WRITTEN ACKNOWLEDGEMENT B62

FIG. 19

ORDER ACKNOWLEDGEMENT

ORDER ID : Q2

ISSUE DATE: 26 JUNE 2021

(ORDERER)

B FACILITIES CORPORATION

Mr. SETSUBI JIRO (ORDER RECIPIENT)

C GAS LTD.

GASU SABURO

WE WILL UNDERTAKE THE ORDER AS FOLLOWS.

CONSTRUCTION NAME: YAMAZAKI RESIDENCE NEW CONSTRUCTION

CONSTRUCTION LOCATION: MIE PREFECTURE, SHIMA CITY

CONSTRUCTION PERIOD: FROM 1 AUGUST 2021 TO 20 DECEMBER 2021

ORDER AMOUNT: ¥■■■ YEN (BREAKDOWN)

■■■ ¥■ YEN

■■■ ¥■ YEN

. . .

| COMPANY NAME | NAME OF PERSON IN CHARGE |
|---|---|
| C GAS LTD. | GASU SABURO |

FIG. 20

ORDER MANAGEMENT SERVER, ORDER MANAGEMENT PROGRAM, ORDER MANAGEMENT METHOD, INFORMATION PROCESSING SERVER, INFORMATION PROCESSING PROGRAM, AND INFORMATION PROCESSING METHOD

FIELD

The present invention relates to an order management server, an order management program, and an order management method that are used to manage placing and receiving of orders between an orderer that places orders for goods and services and an order recipient that receives such orders. The present invention also relates to an information processing server, an information processing program, and an information processing method that allow a third party, which is different from a provider of information to be provided and a recipient of the provided information, to view viewable information created based on the provided information.

BACKGROUND

For example, construction work includes various types of civil engineering and building-related work such as carpentry, reinforcement work, gas work, electrical work, machinery and equipment installation. Thus, a construction contractor that receives an order for construction work from a client places an order, as a prime contractor, with a subcontractor for a part of the construction work, depending on the type of the construction work and the deadline, for example. The subcontractor (first-tier subcontractor) that has received the order from the construction contractor (the prime contractor) places an order with a subcontractor (second-tier subcontractor) for a part of the construction work of the received order. In other words, the first-tier subcontractor is an order recipient in relation to the prime contractor and is an orderer in relation to the second-tier subcontractor.

In this manner, the construction work includes not only the order between the client and the prime contractor but also a group of orders (orders received and placed) at a plurality of tiers in a sense such as the order between the prime contractor and the first-tier subcontractor, the order between the first-tier subcontractor and the second-tier subcontractor, . . . , and an order between an (n−1)th-tier subcontractor and an nth-tier subcontractor.

Herein, each contractor involved in the construction work like the above-described first-tier subcontractor is both an orderer and an order recipient, depending on a manner in which the order is received and placed. The contractor receives orders and places orders with various contractors. Thus, the burden of managing the order placement and receipt upon the contractor is significant. In particular, in placing an order for construction work, the order recipient needs to issue a written acknowledgement (an order acknowledgment) indicating that the order recipient will undertake the order from the orderer, and the burden of issuing this written acknowledgement is significant. As a result, it may happen that a contractor works on site without issuing the written acknowledgement.

Systems have been proposed to reduce burdens on both the client and the order recipient (for example, see JP 2017-162297 A).

JP 2017-162297 A discloses a system for reducing burdens on both companies on the client side and the order-recipient side in ordering with a special order form.

The prime contractor is responsible for the completion of the construction work the order of which is received from the client, and thus needs to keep track of all orders related to the construction work. Specifically, the prime contractor needs to keep track of not only an order to a contractor to which the prime contractor itself has placed the order, which is a first-tier subcontractor as its own contract counterpart, but also an order to a second-tier subcontractor to which the first-tier subcontractor has placed the order and orders to the subsequent subcontractors. However, the prime contractor does not need to know an order amount, in particular, among contract contents for orders other than those of its own contract counterpart. Thus, a system that manages receiving and placing of orders included in construction work the orders of which the prime contractor has received from the client is desired not to allow the prime contractor to view the order amount between contractors when allowing the prime contractor as a third party to view contents of orders placed between the first-tier subcontractor and the second-tier subcontractor and between subsequent contractors.

Thus, it is desirable for a system that manages receiving and placing of orders to allow the third party to view only a part of contract information.

SUMMARY

It is an object of the present invention to provide an order management server, an order management program, an order management method, an information processing server, an information processing program, and an information processing method, which can allow a third party different from both a provider and a recipient to view only a part of information provided from the provider to the recipient.

An order management server according to the present invention is connected via a communication network to each of a first terminal operated by an orderer, a second terminal operated by an order recipient that receives an order from the orderer, and a third terminal operated by a third party different from both the orderer and the order recipient. The server includes: a first receiver configured to receive, from the first terminal, an order content indicating a content of the order; a storage configured to store the order content; a first creating unit configured to create a work order based on the order content; a first viewing controller configured to display the work order on the second terminal; a second receiver configured to receive, from the second terminal, acknowledgement information indicating acceptance of the order; a second creating unit configured to create a written acknowledgement for the accepted order based on the acknowledgement information; and a second viewing controller configured to display the written acknowledgement on the third terminal, in which the second viewing controller displays the written acknowledgement on the third terminal in such a manner that a part of the order content is invisible.

The present invention allows a third party different from both the provider and the recipient to view only a part of the information provided from the provider to the recipient.

BRIEF DESCRIPTION OF DRAWINGS

FIG. 4 is a schematic diagram illustrating an example of user information to be stored in a storage of the server.

FIG. 5 is a schematic diagram illustrating an example of construction information to be stored in the storage.

FIG. 6 is a schematic diagram illustrating an example of order information to be stored in the storage.

FIG. 7 is a schematic diagram illustrating an example of acknowledgement information to be stored in the storage.

FIG. 8 is a schematic diagram illustrating an example of a work order created by the server.

FIG. 9 is a schematic diagram illustrating an example of a written acknowledgement created by the server.

FIG. 12 is a schematic diagram illustrating an example of a user-information registration screen to be displayed on the user terminal.

FIG. 13 is a schematic diagram illustrating an example of a construction-information registration screen to be displayed on the user terminal.

FIG. 14 is a schematic diagram illustrating an example of an order-information registration screen to be displayed on an orderer terminal to be operated by an orderer.

FIG. 15 is a schematic diagram illustrating an example of a work-order confirmation screen to be displayed on an order-recipient terminal to be operated by an order recipient.

FIG. 16 is a schematic diagram illustrating an example of an acknowledgement-information registration screen to be displayed on the order-recipient terminal.

FIG. 17 is a schematic diagram illustrating an example of an order-acknowledgment confirmation screen to be displayed on the orderer terminal.

FIG. 18 is a schematic diagram illustrating an example of an order-list selection screen to be displayed on a third terminal to be operated by a third party.

FIG. 19 is a schematic diagram illustrating an example of an order-list viewing screen to be displayed on the third terminal.

FIG. 20 is a schematic diagram illustrating an example of an order acknowledgment to be displayed on the third terminal.

DETAILED DESCRIPTION

Embodiments of an order management server, an order management program, an order management method, an information processing server, an information processing program, and an information processing method will now be described with reference to the attached drawings.

Herein, the order management server, the order management program, and the order management method according to the present invention are aspects of the information processing server, the information processing program, and the information processing method, respectively, according to the present invention. In other words, each of order contents and written acknowledgements (contents of acknowledgement) in the present invention is an example of each of information to be provided and viewable information in the present invention. Details of the order contents and the like will be described later.

The embodiments described below are examples of a case in which the order management server and the like according to the present invention are used for order management of construction work.

Figure 1:
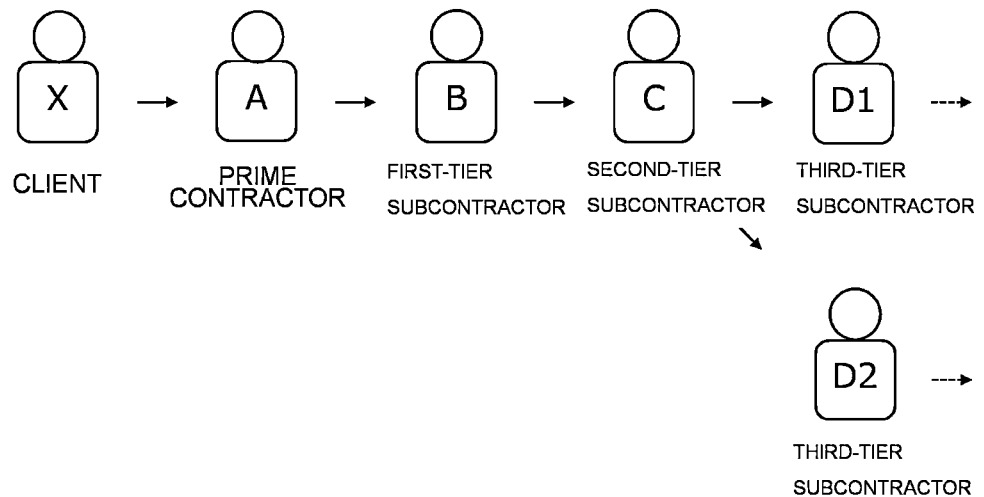
FIG. 1 is a schematic diagram illustrating a relation between users of an order management server according to one or more embodiments of the present invention.

FIG. 1 is a schematic diagram illustrating a relation between users of the order management server according to one or more embodiments of the present invention (hereinafter, referred to as "present server"). The figure indicates that a client X has placed an order with a prime contractor A for construction work. Specifically, the client X is an orderer, and the prime contractor A is an order recipient. Similarly, the figure indicates that the prime contractor A has placed an order with a first-tier subcontractor B, that the first-tier subcontractor B has placed an order with a second-tier subcontractor C, and that the second-tier subcontractor C has placed an order with each of third-tier subcontractors D1 and D2.

The users of the present server are persons who have directly or indirectly accepted the order from the client X. The person who has directly accepted the order from the client X is the prime contractor A. The persons who have indirectly accepted the order from the client X are the first-tier subcontractor B, the second-tier subcontractor C, the third-tier subcontractors D1 and D2, and the like.

Order Management Server

Figure 2:
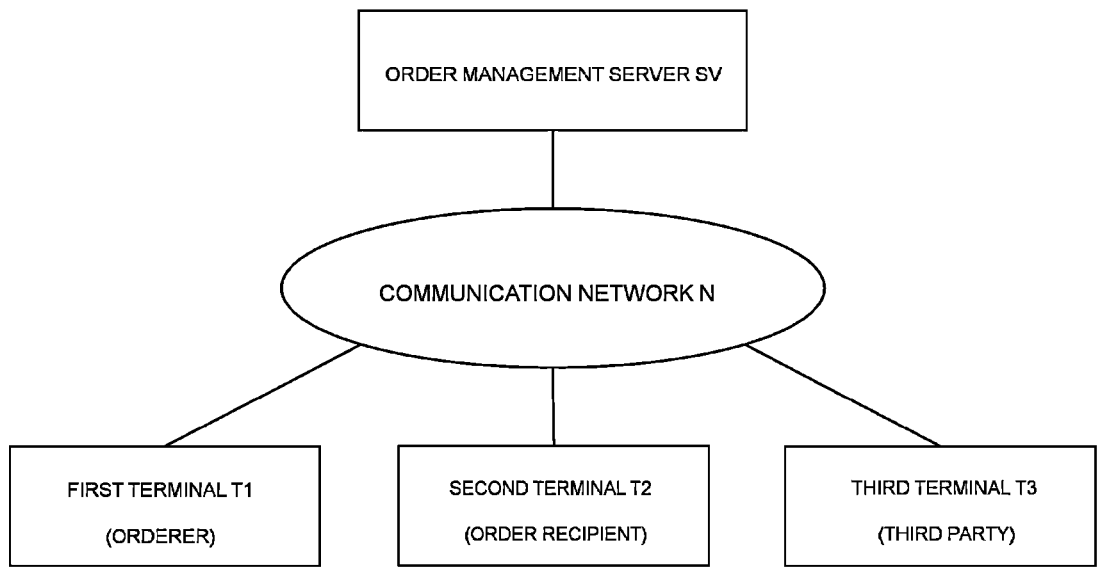
FIG. 2 is a network configuration diagram illustrating an embodiment of the server.

FIG. 2 is a network configuration diagram illustrating an embodiment of the present server.

A present server SV is operated by an administrator (e.g., any of the users or a person different from the users) who manages receiving and placing of an order between orderers and order recipients, and the present server SV is used by the users.

The present server SV is implemented by an information processing device such as a personal computer. The present server SV executes the order management program according to the present invention (hereinafter, referred to as "present program"). The present program to be executed by the present server SV implements the order management method according to the present invention (hereinafter, referred to as "present method") in conjunction with hardware resources of the present server SV.

The hardware resources of the present server SV are, for example, processors such as a central processing unit (CPU), a micro processing unit (MPU), and a digital signal processor (DSP). The processor executes the instructions described in the present program, and thus implements each of the below-described means included in the present server SV.

When the present program is executed by an unillustrated information processing device that is different from the present server SV, this information processing device functions in the same way as the present server and implements the present method.

The present server SV is communicatively connected to a first terminal T1, a second terminal T2, and a third terminal T3 via a communication network N.

The communication network N is a computer communication network such as the Internet and a local area network (LAN).

The present server SV, together with the first terminal T1, the second terminal T2, and the third terminal T3, constitutes an order management system (hereinafter, referred to as "present system"). In other words, the present system includes the present server SV, the first terminal T1, the second terminal T2, and the third terminal T3.

The first terminal T1 is an information processing device to be operated by an orderer. The first terminal T1 is, for example, a smartphone, a personal computer, or the like.

The second terminal T2 is an information processing device to be operated by an order recipient. The second terminal T2 is, for example, a smartphone, a personal computer, or the like.

The third terminal T3 is an information processing device to be operated by a third party different from the orderer and the order recipient. The third terminal T3 is, for example, a smartphone, a personal computer, or the like.

Configuration of Order Management Server

Figure 3:
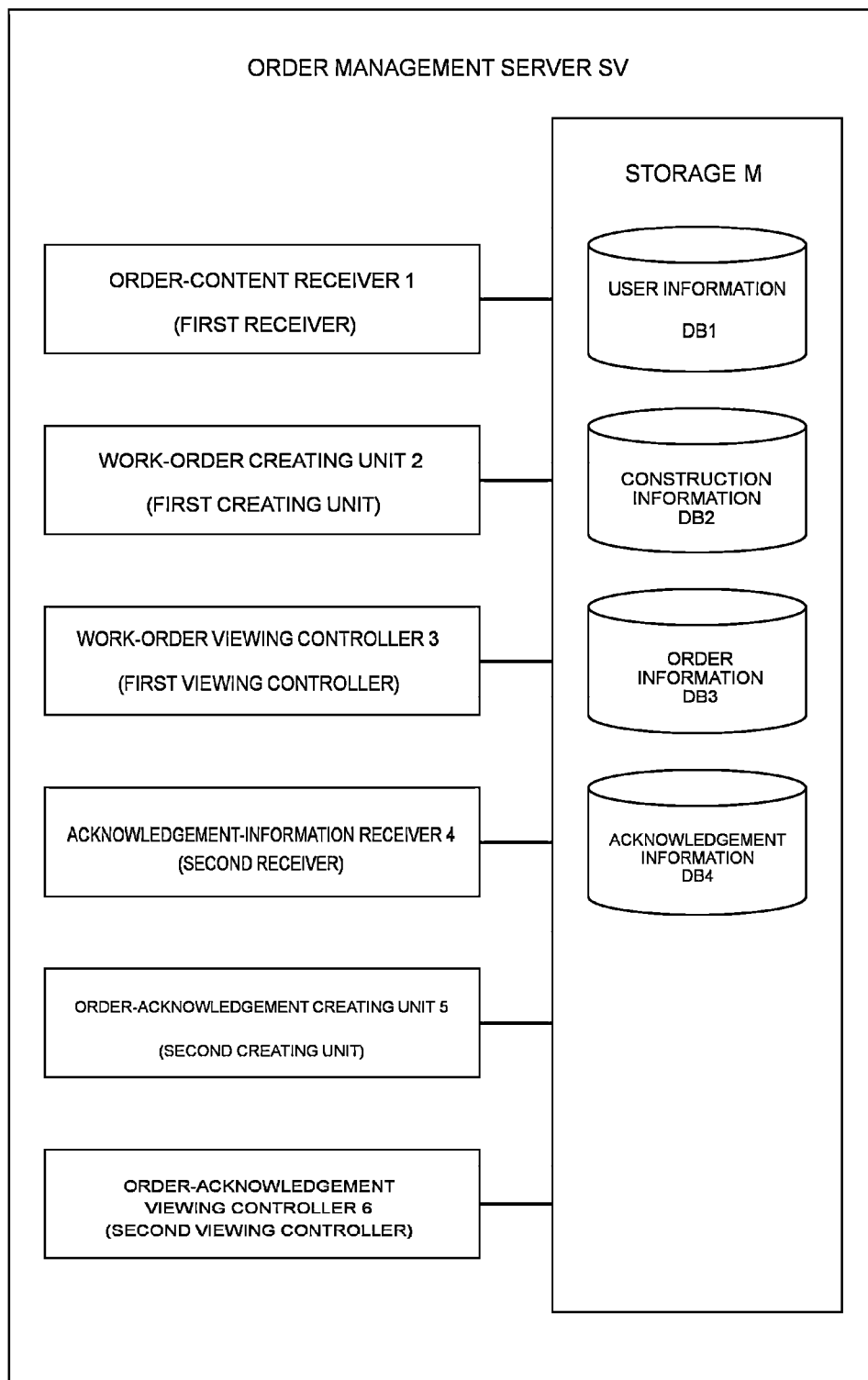
FIG. 3 is a functional block diagram illustrating the embodiment of the server.

FIG. 3 is a functional block diagram illustrating an embodiment of the present server. The present server SV includes a storage M, an order-content receiver (a first receiver) 1, a work-order creating unit (a first creating unit) 2, a work-order viewing controller (a first viewing controller) 3, an acknowledgement information receiver (a second receiver) 4, an order-acknowledgment creating unit (a second creating unit) 5, and an order-acknowledgment viewing controller (a second viewing controller) 6.

The storage M stores therein the present program and information to be used by the present server SV to implement the present method. The storage M is a non-transitory storage medium, for example, a hard disk drive (HDD), a solid state drive (SSD), a random access memory (RAM), a semiconductor memory device such as a flash memory, or the like.

The storage M stores therein a user information database (DB) 1, a construction information database (DB) 2, an order information database (DB) 3, and an acknowledgement information database (DB) 4. Details of information to be stored in each database will be described later.

The first receiver 1 receives, from the first terminal T1, an order content indicating contents of an order from an orderer to an order recipient. Details of the order content will be described later.

The first creating unit 2 creates a work order, based on order information stored in the storage M. The contents of the work order and a method of creating the work order will be described later.

The first viewing controller 3 displays the work order on the second terminal T2 and allows the order content displayed on the work order to be viewed by the order recipient.

The second receiver 4 receives, from the second terminal T2, acknowledgement information containing a content of acknowledgement (content that is the same as the order content) indicating that the order recipient will undertake the order from the orderer. Details of the acknowledgement information will be described later.

The second creating unit 5 creates a written acknowledgement (an order acknowledgment) of the order. The contents of the written acknowledgement and a method of creating the written acknowledgement will be described later.

The second viewing controller 6 displays the written acknowledgement on the first terminal T1 and the third terminal T3 and allows the content of acknowledgement (the order content), the fact of the acknowledgement, and the like displayed on the written acknowledgement to be viewed by the orderer and a third party. However, a part of the content of acknowledgement displayed on the written acknowledgement displayed on the first terminal T1 is displayed on the third terminal T3 in a manner that is invisible on the written acknowledgement displayed on the third terminal T3.

User Information

The user information is information for each user who uses the present server SV. The users are, as described above, the prime contractor A and the subcontractors (B, C, D1, D2, etc.,). The user registers as a user to start using the present server SV. The user registration is performed when the user transmits, to the present server SV, his/her own information and the like necessary for the present server SV to manage receiving and placing of orders. The user information is stored in the storage M for each user registration.

FIG. 4 is a schematic diagram illustrating an example of the user information to be stored in the storage M. The figure indicates that the user information contains a name of a user, a name of a person in charge of the user, and an e-mail address of the user, which are associated with a user ID and stored in the user information DB1 of the storage M. By referring to the user information DB1 using the user ID, the present program can identify (retrieve from the user information DB1) the name of the user and other information associated with the user ID and stored in the user information DB1.

The user ID is information that the present system (i.e., each of the present server SV, the first terminal T1, the second terminal T2, and the third terminal T3. The same applies hereafter) uses to identify the user. The user ID is assigned by the present server SV, for example, at the time of user registration and stored in the user information DB1.

The figure indicates that a name of a user with the user ID "A" is "A Builder Corporation", a full name of a person in charge of this user is "KOUMU Taro", and an e-mail address of the user is "a@domain", for example.

Construction Information

Construction information is information about the subject (construction) of the contract (order) the order receiving and placing of which are managed in the present system. In other words, the construction information is construction for which the prime contractor A accepts an order from the client X. The construction information is also information about the order from the prime contractor A to the first-tier subcontractor B or the order from the (n−1)th-tier subcontractor to the nth-tier subcontractor.

The present server SV receives the information about the construction from a terminal operated by a user (e.g., the prime contractor A) who uses the present server SV, for example, and stores the information in the storage M.

FIG. 5 is a schematic diagram illustrating an example of the construction information to be stored in the storage M. The figure indicates that the construction information contains the name of the construction and the address where the construction is to be performed, which are associated with a construction ID and stored in the construction information DB2 of the storage M. By referring to the construction information DB2 using the construction ID, the present program can identify the name of the construction and other information associated with the construction ID and stored in the construction information DB2.

The construction ID is information that the present system uses to identify the construction the order receiving and placing of which are to be managed by the present system. The construction ID is assigned by the present server SV and stored in the construction information DB2 when the present server SV has received information (e.g., the name and the address of the construction) about the construction from a terminal operated by the prime contractor A, for example.

The name, the address, and the like of the construction is information that identifies the construction the order receiving and placing of which are to be managed by the present system. Information such as the name of the construction work is received by the present server SV from a terminal operated by a user (e.g., the prime contractor A), for example, and stored in the construction information DB2.

The figure indicates that the name of the construction with a construction ID "W1" is "Yamazaki Residence New Construction", for example.

Order Information

The order information is information that indicates the content of an order (the order content) from an orderer to an order recipient. The order information is information that is viewed by the order recipient that accepts the order. The order information is stored in the storage M each time the present server SV receives the order content from the first terminal T1.

FIG. 6 is a schematic diagram illustrating an example of the order information to be stored in the storage M. The figure indicates that the order information contains the construction ID, the user ID of the orderer, the user ID of the order recipient, and the order content, which are associated with an order ID and stored in the order information DB3 of the storage M. By referring to the order information DB3 using the order ID, the present program can identify the order content and other information associated with the order ID and stored in the order information DB3.

The order ID is information that the present system uses to identify the order content. The order ID is assigned by the present server SV and stored in the order information DB3 when the present server SV has received the order content from the first terminal T1, for example.

The construction ID to be stored in the order Information DB3 is the construction ID of the construction corresponding to the order ID. The user IDs of the orderer and the order recipient to be stored in the order information DB3 are the user IDs of the orderer and the order recipient of the order corresponding to the order ID. The construction ID and the user ID are, for example, transmitted from the first terminal T1 to the present server SV when the present server SV receives the order content from the first terminal T1.

The order content to be stored in the order information DB3 is received by the present server SV from the first terminal T1 and is stored in the order information DB3.

The figure indicates that the order content is stored for each order, for example. Specifically, the figure indicates, for example, that the order corresponding to an order ID "Q1" is an order for construction with the construction ID "W1", that the user ID of the orderer of this order is "A", and that the user ID of the order recipient of this order is "B".

Acknowledgement Information

The acknowledgement information is information indicating that an order recipient accepts an order from an orderer. The acknowledgement information is information that the orderer and a third party refer to in order to confirm the acceptance of the order recipient. The acknowledgement information is stored in the storage M each time the present server SV receives the acknowledgement information.

FIG. 7 is a schematic diagram illustrating an example of the acknowledgement information to be stored in the storage M. The figure indicates that the acknowledgement information contains the order ID, the signature in the name of an order recipient (name of the company which accepts the order), and the signature of a person in charge for the order recipient (person in charge of accepting the order), which are associated with an order reception ID and stored in the acknowledgement information DB4 of the storage M. By referring to the acknowledgement information DB4 using the order reception ID, the present program can identify the signature of the name of the order recipient and other information associated with the order reception ID and stored in the acknowledgement information DB4.

The order reception ID is information that the present system uses to identify an order that has been contracted between an orderer and an order recipient, which is an order that the order recipient has accepted. The order reception ID is assigned by the present server SV and stored in the acknowledgement information DB4 when the present server SV has received the acknowledgement information from the second terminal T2, for example.

The order ID to be stored in the acknowledgement information DB4 is the order ID of the order accepted by the order recipient and is transmitted to the present server SV from the second terminal T2, for example, when the present server SV has received the signature from the second terminal T2.

The signature in the name of the company which accepts the order and the signature of the person in charge of accepting the order are information indicating acceptance of the order by the order recipient and are received by the present server SV from the second terminal T2.

The figure indicates, for example, that the order ID of the accepted order identified by an order reception ID "R2" is "Q2", and that the name of the company of the order recipient that has accepted to undertake the order and the signature of the person in charge of accepting the order are "C Gas Ltd." and "GASU Saburo", respectively.

Work Order

FIG. 8 is a schematic diagram illustrating an example of a work order created by the first creating unit 2 of the present server SV. Each time the present server SV receives an order content from the first terminal T1, the present server SV creates a work order using the information (user information, construction information, order information, etc.,) stored in the storage M and stores the work order in the storage M. The present server SV allows the work order to be viewed by the order recipient of the order. The present server SV transmits, to the e-mail address of an order recipient retrieved from the user information DB1, an e-mail notifying the order recipient of the presence of a work order (before acceptance) addressed to the order recipient, for example. After receiving this e-mail, the order recipient accesses the present server SV and views this work order.

The figure indicates that the work order is for the order identified by the order ID "Q2" from an orderer "B Facilities Corporation" to the order recipient "C Gas Ltd.". The figure indicates that the name of the construction and the like related to the order and the order amount and the like are displayed on the work order.

Written Acknowledgement (Order Acknowledgment)

FIG. 9 is a schematic diagram illustrating an example of an order acknowledgment created by the second creating unit 5 of the present server SV. Each time the present server SV receives acknowledgement information from the second terminal T2, the present server SV creates an order acknowledgment using the information stored in the storage M and stores the order acknowledgment in the storage M. The present server SV allows the order acknowledgment to be viewed by the orderer of the order and a third party. The present server SV transmits an e-mail to the orderer, for example, as well as allowing the order recipient to view the work order.

The figure indicates that the order acknowledgment is for the order identified by the order ID "Q2" from the orderer "B Facilities Corporation" to the order recipient "C Gas Ltd.". The figure indicates that the name of the construction related to the order, the order amount, and the like, which are displayed on the work order illustrated in FIG. 8, are displayed on the order acknowledgment. The figure indicates that the signature in the name of the company which accepts the order and the signature of the person in charge of accepting the order are displayed on the order acknowledgment. As described above, the order acknowledgment is created based on the order information indicating the contents of the order (the order contents) and the acknowledgement information indicating the acceptance of the order. In other words, the present server SV creates the order acknowledgment, based on the order contents and the acknowledgement information.

Order Management Method

Figure 10:
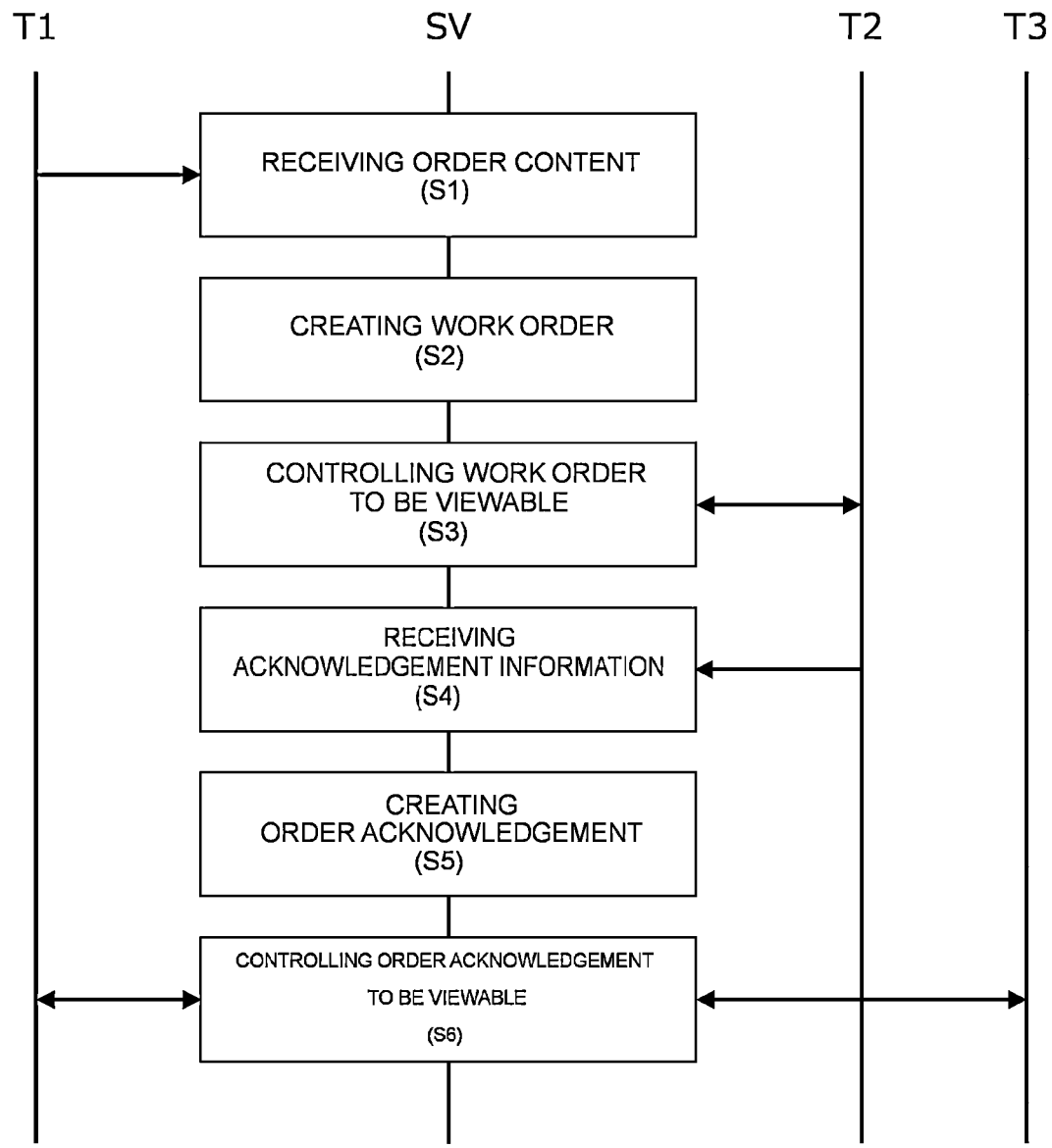
FIG. 10 is a sequence diagram illustrating an embodiment of an order management method according to one or more embodiments of the present invention to be performed by the server.

FIG. 10 is a sequence diagram illustrating an embodiment of the present method. Herein, in the following description, it is assumed that the first terminal T1 is a terminal to be operated by "B Facilities Corporation" as an orderer, the second terminal T2 is a terminal to be operated by "C Gas Ltd." as an order recipient, and the third terminal T3 is a terminal to be operated by the "prime contractor A" as a third party.

First, the present server SV, using the first receiving part 1, receives order contents created by the orderer "B Facilities Corporation" from the first terminal T1 and stores the order contents in the storage M (S1).

Then, the present server SV, using the first creating unit 2, creates a work order with the order contents and other information stored in the storage M (S2).

Then, the present server SV, using the first viewing controller 3, controls the work order so as to be viewable from the second terminal T2 (S3).

Then, the present server SV, using the second receiver 4, receives acknowledgement information from the second terminal T2 (S4).

Then, the present server SV, using the second creating unit 5, creates an order acknowledgment with the order contents, the acknowledgement information, and other information stored in the storage M (S5).

Then, the present server SV, using the second viewing controller 6, controls the order acknowledgment so as to be viewable from each of the first terminal T1 and the third terminal T3 (S6). However, as described later, some of the displayed contents of the order acknowledgment that can be viewed from the first terminal T1 cannot be viewed from the third terminal T3.

Communication Between Order Management Server and Each Terminal

The present server SV operates as what is called a web server, for example, and displays below-described each screen as web pages on the first terminal T1, the second terminal T2, and the third terminal T3. The orderer, the order recipient, and the third party receive (view) information displayed on each screen of the first terminal T1, the second terminal T2, and the third terminal T3, or input information into each screen and transmit the information to the present server SV. Before transmitting and receiving various types of information to and from the present server SV using each terminal, the orderer, the order recipient, and the third party log in to a web service provided by the present server SV (function implemented by the present program), for example, from each terminal. Authentication information such as a user ID (e.g., user ID) and a password required for log-in are stored in the user information DB1. When receiving the authentication information from each terminal, the present server SV authenticates the user by referring to the user information DB1. The orderer, the order recipient, and the third party log in to the web service of the present server SV, and thus the present server SV can identify the orderer, the order recipient, and the third party who operate each terminal to transmit and receive various types of information to and from the present server SV during the log-in state.

Selection of Menu

Figure 11:
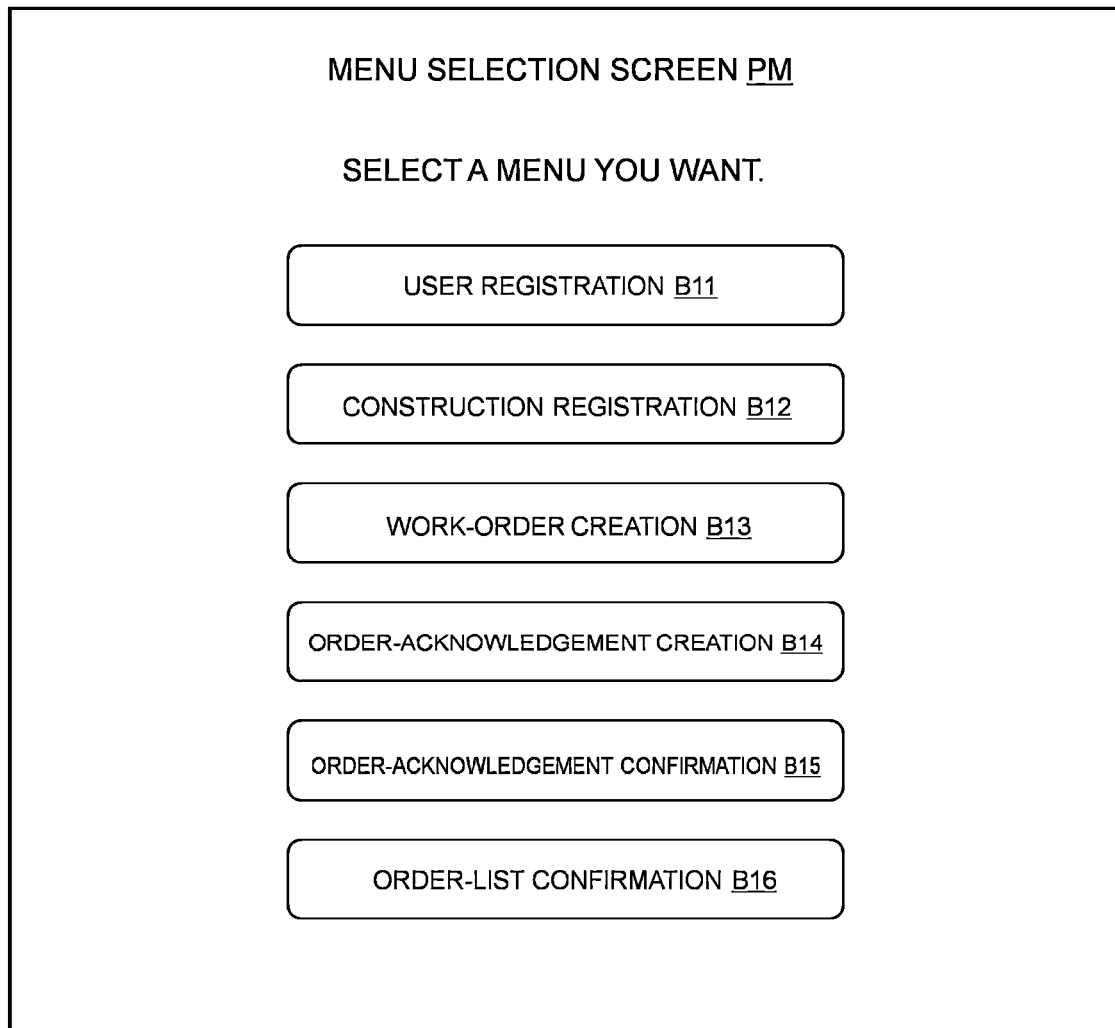
FIG. 11 is a schematic diagram illustrating an example of a menu selection screen to be displayed on a user terminal to be operated by a user.

FIG. 11 is a schematic diagram of a menu selection screen PM to be displayed on each of the first terminal T1, the second terminal T2, and the third terminal T3. The figure indicates that buttons each corresponding to user registration, construction registration, work-order creation, order-acknowledgment creation, order-acknowledgment confirmation, and order-list confirmation are displayed on the screen PM as means of selecting menus (information processing to be performed by the present server SV).

Each menu is selected by pressing the button the menu name of which is displayed on the screen PM. Specifically, for example, the menu "User Registration" is selected by pressing a button B11. Herein, the pressing operation of the button B11 is, for example, an operation in which each terminal includes a touch panel and an operator of the terminal touches an area where the button B11 is displayed on the touch panel (hereinafter, the same applies to the pressing operation of the button).

The screen PM is displayed on a terminal operated by a user when the user logs in to the web service provided by the present server SV, for example. In other words, when authenticating the user, the present server SV displays the screen PM on the terminal of the user.

Registration of User Information

FIG. 12 is a schematic diagram of a user-information registration screen P1 to be displayed when the "User Registration" button B11 displayed on the screen PM illustrated in FIG. 11 is pressed.

The figure indicates that user information ("Name", "Name of Person in Charge", "E-Mail Address", etc.,) of the user "A Builder Corporation" is input in the screen P1.

When a "Register" button B1 in the screen P1 is pressed, the information input in the screen P1 is transmitted to the present server SV as the user information. When receiving the user information, the present server SV assigns a user ID to the user information and stores the user ID together with the received user information in the user information DB1 as described above.

Registration of Construction Information

FIG. 13 is a schematic diagram of a construction-information registration screen P2 to be displayed when a "Construction Registration" button B12 displayed on the screen PM illustrated in FIG. 11 is pressed.

The figure indicates that information indicating the contents of the construction ("construction name", "construction location", "construction period", etc.,) for the construction name "Yamazaki Residence New Construction" is input in the screen P2 (which is selected with what is called a pull-down menu from among a plurality of pieces of information stored in the storage M).

When the "Register" button B2 in the screen P2 is pressed, the information input in the screen P2 is transmitted to the present server SV as the construction information. When receiving the construction information, the present server SV assigns a construction ID to the construction information and stores the construction ID together with the received construction information in the construction information DB2 as described above.

The construction information is registered with the present server SV, for example, by the prime contractor A, who has accepted the order from the client X, operating the third terminal T3.

Registration of Order Contents

FIG. 14 is a schematic diagram of an order-content registration screen P3 to be displayed when a "Work-Order Creation" button B13 displayed on the screen PM illustrated in FIG. 11 is pressed.

The screen P3 is displayed on the first terminal T1 when the orderer "B Facilities Corporation" presses the button B13.

The figure indicates that information indicating the contents ("orderer", "order recipient", "construction name", "order amount", etc.,) of an order from the orderer "B Facilities Corporation" to the order recipient (order recipient before accepting the order) "C Gas Ltd." is input in the screen P3.

When the "Register" button B3 in the screen P3 is pressed, the order contents input in the screen P3 are transmitted from the first terminal T1 to the present server SV. When receiving the order contents, the present server SV assigns an order ID to the order of the order contents and stores the order ID together with the received order contents in the order information DB3 as described above.

Confirmation of Word Order (Creation of Order Acknowledgment)

FIG. 15 is a schematic diagram of a work order confirmation screen P41 to be displayed when a "Order-Acknowledgment Creation" button B14 displayed on the screen PM illustrated in FIG. 11 is pressed.

The screen P41 is displayed on the second terminal T2 when the order recipient (order recipient before accepting the order) "C Gas Ltd." to which the order has been placed from the orderer "B Facilities Corporation" presses the button B14. The screen P41 displays, among orders managed by the present server SV, for example, a list of orders for orders that are placed to "C Gas Ltd." but have not been registered with the present server SV as being undertaken by "C Gas Ltd.".

"C Gas Ltd." selects an order to undertake from the list of orders displayed on the screen P41. The figure indicates that the order for the construction "Yamazaki Residence New Construction" is selected from the list of orders displayed on the screen P41.

When a "Confirm Work Order" button B41a in the screen P41 is pressed, the order ID "Q2" (see FIG. 6) corresponding to the order the order recipient of which is "C Gas Ltd.", among orders for the construction "Yamazaki Residence New Construction", is transmitted from the second terminal T2 to the present server SV. The present server SV retrieves the work order corresponding to the order of the order ID "Q2" from the storage M and transmits the work order to the second terminal T2. In other words, the present server SV displays the work order illustrated in FIG. 8 on the second terminal T2.

When reviewing the order contents displayed on the work order and then decides to undertake the order, "C Gas Ltd." presses a "Register Acceptance" button B41b in the screen P41.

When the "Register Acceptance" button B41b in the screen P41 is pressed, an acknowledgement-information registration screen P42 for registering acknowledgement information is displayed on the second terminal T2.

FIG. 16 is a schematic diagram of the acknowledgement-information registration screen P42. The figure indicates that the signature in name of the company and the signature of a person in charge of "C Gas Ltd." are input in the screen P42 as the acknowledgement information indicating that "C Gas Ltd." will accept the order from "B Facilities Corporation". These signatures are input in the screen P42, for example, as what is called handwritten characters created by operating input means (keyboard, mouse, etc.,) of the second terminal T2.

The signatures as the acknowledgement information input in the screen P42 are transmitted together with the order ID "Q2" from the second terminal T2 to the present server SV when a "Register" button B42 on the screen P42 is pressed. When receiving the acknowledgement information, the present server SV assigns an order acceptance ID to the acknowledgement information and stores the order acceptance ID together with the received acknowledgement information in the acknowledgement information DB4 as described above (see FIG. 7).

Confirmation of Order Acknowledgment by Orderer

FIG. 17 is a schematic diagram of an order-acknowledgment confirmation screen P5 to be displayed when a "Order-Acknowledgment Confirmation" button B15 displayed on the screen PM illustrated in FIG. 11 is pressed.

The screen P5 is displayed on the first terminal T1 when the orderer "B Facilities Corporation" presses the button B15. The screen P5 displays, among the orders managed by the present server SV, for example, a list of orders the orderer of which is "B Facilities Corporation". The figure indicates that the order for the construction "Yamazaki Residence New Construction" is selected from the list of orders displayed on the screen P5.

When the "Confirm Acknowledgment" button B5 in the screen P5 is pressed, the order ID "Q2" (see FIG. 6) corresponding to the order the orderer of which is "B Facilities Corporation", among the orders for the construction "Yamazaki Residence New Construction", is transmitted from the first terminal T1 to the present server SV. The present server SV retrieves the order acknowledgment corresponding to the order of the order ID "Q2" from the storage M and transmits the order acknowledgement to the first terminal T1. In other words, the present server SV displays the order acknowledgment illustrated in FIG. 9 on the first terminal T1.

"B Facilities Corporation" can confirm that "C Gas Ltd." has accepted the order from "B Facilities Corporation" by viewing the order acknowledgment that contains the signature of "C Gas Ltd.".

Confirmation of Order Acknowledgment by Third Party

FIG. 18 is a schematic diagram of an order-list selection screen P61 to be displayed when a "Order-List Confirmation" button B16 displayed on the screen PM illustrated in FIG. 11 is pressed.

The screen P61 is displayed on the third terminal T3 when the prime contractor "A Builder Corporation" presses the button B16. The screen P61 displays, among the orders managed by the present server SV, for example, a list of orders the orderer of which is "A Builder Corporation". The figure indicates that the order for the construction "Yamazaki Residence New Construction" is selected from the list of orders displayed on the screen P61.

When a "Confirm List" button B61 in the screen P61 is pressed, the construction ID "W1" (see FIG. 6) corresponding to the construction "Yamazaki Residence New Construction" selected in the screen P61 is transmitted from the third terminal T3 to the present server SV. The present server SV refers to the user information DB1 and the acknowledgement information DB4, thereby identifying the combination of the orderer and the order recipient for each order associated with the construction ID "W1", and the present server SV displays the identified combination on the third terminal T3 as an order list.

FIG. 19 is a schematic diagram of an order-list viewing screen P62 to be displayed on the third terminal T3. The figure indicates the order from "A Builder Corporation" to "B Facilities Corporation", the order from "B Facilities Corporation" to "C Gas Ltd.", the order from "C Gas Ltd." to "D1 Electric Ltd.", and the like, as orders for the construction "Yamazaki Residence New Construction". The figure indicates that the order from "B Facilities Corporation" to "C Gas Ltd." is selected from among the orders displayed on the screen P62.

When a "Confirm Acknowledgment" button B62 in the screen P62 is pressed, the order ID "Q2" of the order from "B Facilities Corporation" to "C Gas Ltd.", which is selected in the screen P62, is transmitted from the third terminal T3 to the present server SV. The present server SV retrieves the order acknowledgment corresponding to the order of the order ID "Q2" from the storage M.

The present server SV identifies the operator of the third terminal T3 as a third party who is neither the orderer nor the order recipient of the order of the order ID "Q2", based on the authentication information from the third terminal T3 at the time of log-in. The present server SV then displays the retrieved order acknowledgment on the third terminal T3 in such a manner that parts related to the order amount displayed on the retrieved order acknowledgment are invisible.

FIG. 20 is a schematic diagram illustrating an example of the order acknowledgment to be displayed on the third terminal T3. The displayed contents of the order acknowledgment illustrated in the figure are the same as the displayed contents of the order acknowledgment illustrated in FIG. 9. However, the parts related to the order amount displayed in the order acknowledgment illustrated in FIG. 9 are blacked out in the order acknowledgment in FIG. 20. As a result, "A Builder Corporation" viewing this order acknowledgment cannot see the order amount and the like that are blacked out although "A Builder Corporation" can confirm that "C Gas Ltd." has received the order from the "B Facilities Corporation", for example.

Conclusion

According to the embodiments described above, the present server SV can manage each order receipt and placement between "Prime Contractor A" and subcontractors with respect to an order from "Client X", and more specifically, the present server SV can allow users of the present server SV to view a combination of each orderer and the corresponding order recipient, order contents, and the fact that the order recipient has accepted the order, for example. In particular, when allowing a third party different from the orderer and the order recipient to view the fact of an order, the order contents, and the like, the present server SV allows the third party to view the acknowledgement contents and other information in such a manner that the order amount contained in the order contents is invisible.

Thus, when allowing a third party to view an acknowledgement content for an order from an orderer to an order recipient, the present server SV can allow the third party to view only a part of the acknowledgement content.

Although the embodiments described above are examples in which the prime contractor is a third party, the third party in the present invention is not limited to the prime contractor. More specifically, for example, the present server SV may allow "B Facilities Corporation" that has placed an order with "C Gas Ltd." to view the order acknowledgment for the order from "C Gas Ltd." to "D1 Electric Ltd.". In this case, "C Gas Ltd." is an orderer, "D1 Electric Ltd." is an order recipient, and "B Facilities Corporation" is a third party.

Although the embodiments described above are examples in which the prime contractor that has received an order from a client confirms order acknowledgments of all orders between subcontractors (see FIG. 19), the present invention is not limited to the above. For example, the present server may be configured so that users of the present server can check order acknowledgments between contractors downstream of themselves (e.g., contractors downstream of the second-tier subcontractor C in FIG. 1 are the third-tier subcontractor, the fourth-tier subcontractor . . . ).

The embodiments described above are examples in which a third party is allowed to view acknowledgement contents and other information in such a manner that the order amount contained in the order contents is invisible. However, the information that is invisible in the present invention is not limited to the above and may be, for example, personal information contained in the order contents. More specifically, for example, the present server may allow the third party to view the acknowledgement contents in such a manner that the personal information contained in the order contents is invisible.

Information that is invisible to a third party in the present invention may be designated by either one of an orderer or an order recipient. More specifically, for example, the present server receives, from a terminal operated by an orderer or an order recipient, some pieces of information selected by the orderer or the order recipient among pieces of information contained in the order contents and stores the received information in the storage. The present server then allows the third party to view the acknowledgement contents in such a manner that the pieces of information selected by the orderer or the order recipient are invisible.

Information that is invisible to a third party in the present invention may be selected for the present server. More specifically, for example, the present server may include an information selection unit configured to select some pieces of information of the order contents, and the viewing controller may allow the third party to view the acknowledgement contents in such a manner that the pieces of information of the order contents selected by the information selection unit are invisible.

In the embodiments described above, the acknowledgement contents to be viewed by a third party are created based on the order contents received from a terminal operated by an orderer and the acknowledgement information received from a terminal operated by an order recipient. In the present invention, the order contents and the acknowledgement information to be used to create the acknowledgement contents only need to be stored in the present server at the time of creating the acknowledgement contents. The order contents to be stored in the storage are not necessarily received by the present server from a terminal operated by the orderer. Similarly, the acknowledgement information to be stored in the storage is not necessarily received by the present server from a terminal operated by the order recipient.

In the above-described embodiments, by allowing a third party to view the acknowledgement contents in which some pieces of information are blacked out, the third party cannot view the pieces of information blacked out in the acknowledgement contents. In the present invention, the manner by which a part of information to be viewed by a third party is made invisible to a third party is not limited to blacking out (what is called masking process), but may be, for example, deletion from the information to be viewed by the third party (erasing process), or encryption. In other words, the present server includes various means to make information invisible, such as a masking unit, an erasing unit, an encryption unit, and uses these means to perform information processing so that a third party cannot see some pieces of information contained in the acknowledgement contents.

Herein, some pieces of information contained in encrypted acknowledgement contents are visible with a decryption key for decryption. The decryption key may, for example, be transmitted by the present server to a terminal to be operated by an orderer or an order recipient, so that the orderer or the order recipient may decrypt the encrypted information using the decryption key and make it visible.

For example, the present server may transmit the decryption key to a terminal to be operated by a third party. In this case, the timing when the decryption key is transmitted from the present server to the third party is, for example, after a predetermined period of time elapses since the present server has transmitted, to the terminal to be operated by the third party, the acknowledged contents that contain some pieces of information in an invisible manner. As a result, although the third party cannot see the pieces of information in the acknowledgement contents at the beginning of viewing, after the predetermined period of time (e.g., a period of time specified by the orderer or the order recipient and stored in the storage of the present server) has elapsed, the third party can see the pieces of information invisible before.

The server may transmit the decryption key to a terminal to be operated by a person different from any of the orderer, the order recipient, or the third party, for example. More specifically, for example, a decryption key for the acknowledgement contents between the prime contractor (the orderer) that has accepted the order from the client (the third party) and the first-tier subcontractor (the order recipient) that has accepted the order from the prime contractor may be transmitted to a terminal to be operated by the second-tier subcontractor that has accepted the order from the first-tier subcontractor.

Information Processing Server, Information Processing Program, and Information Processing Method According to the Present Invention As described above, the present server is an aspect of the information processing server according to the present invention (hereinafter, referred to as "subject server"), the present program is an aspect of the information processing program according to the present invention (hereinafter, referred to as "subject program"), and the present method is an aspect of the information processing method according to the present invention (hereinafter, referred to as "subject method"). In other words, the order management that the present server implements in the embodiments described above in which a third party is allowed to view only a part of an acknowledgement content for an order from an orderer to an order recipient is an example of the information processing that the subject server implements. The subject server is implemented by an information processing device such as a personal computer. The subject server executes the subject program. The subject program to be executed by the subject server implements the subject method in conjunction with hardware resources of the subject server.

The subject server allows a third party different from both a provider and a recipient of information provided by the provider to view viewable information created based on the provided information, and allows the third party to view the viewable information in such a manner that a part of the provided information contained in the viewable information is invisible. The third party cannot view the part of the provided information contained in the viewable information.

The order information containing order contents stored by the present server is an example of the provided information stored by the subject server. The written acknowledgement (acknowledgement contents) created by the present server is an example of the viewable information created by the subject server.

Herein, the information to be processed by the subject server is not limited to information about receipt and placement of orders to be processed by the present server. In other words, the information to be processed by the subject server only needs to be information exchanged among three parties of a provider, a recipient that receives provided information from the provider, and a third party that views viewable information created based on the provided information. The information to be processed by the subject server may be, for example, information about manufacture of products (e.g., process charts, parts lists, estimates, drawings) or information about management of a company (e.g., business plans, financing sources).

Features of the Present Server, the Present Program, and the Present Method

The features of the present server, the present program and the present method described above will now be summarized.

Features of the Present Server

The present server is configured to be connected via a communication network (N) to each of a first terminal (T1) to be operated by an orderer (e.g., B Facilities Corporation), a second terminal (T2) to be operated by an order recipient (e.g., C Gas, Ltd.) that accepts an order from the orderer, and a third terminal (T3) to be operated by a third party (e.g., A Builder Corporation) different from both the orderer and the order recipient. The present server includes: a first receiver (1) configured to receive, from the first terminal, an order content indicating a content of the order; a storage (M) configured to store therein the order content; a first creating unit (2) configured to create a work order, based on the order content; a first viewing controller (3) configured to display the work order on the second terminal; a second receiver (4) configured to receive, from the second terminal, acknowledgement information indicating acceptance of the order; a second creating unit (5) configured to create a written acknowledgement for the accepted order, based on the acknowledgement information; and a second viewing controller (6) configured to display the written acknowledgement on the third terminal, in which the second viewing controller displays the written acknowledgement on the third terminal in such a manner that a part of the order content (e.g., order amount) is invisible.

In the present server, the second creating unit may create the written acknowledgement using the order content.

In the present server, the order content may contain an order amount that is a payment for the order, and the second viewing controller may display the written acknowledgement on the third terminal in such a manner that the order amount is invisible.

In the present server, the second receiver may receive a signature of the order recipient as the acknowledgement information, the second creating unit may create the written acknowledgement using the signature, and the second viewing controller may display the written acknowledgement on the third terminal in such a manner that the signature is visible.

In the present server, the second viewing controller may display the written acknowledgement on the first terminal in such a manner that all of the order contents are visible.

In the present server, the storage may store therein a secondary acknowledgement content indicating a content of a secondary acknowledgement between the order recipient (e.g., C Gas Ltd.) and a secondary contractor (e.g., D1 Electric Ltd.) to which the order recipient places the order. The present server may include a third viewing controller configured to display a part of the secondary acknowledgement content on the first terminal, in which the secondary acknowledgement content may contain a secondary order amount that is a payment for the secondary acknowledgement, and the third viewing controller may display the secondary acknowledgement content on the first terminal in such a manner that the secondary order amount is invisible.

The present server is configured to be connected via a communication network (N) to each of a first terminal (T1) to be operated by an orderer (e.g., B Facilities Corporation), a second terminal (T2) to be operated by an order recipient (e.g., C Gas Co., Ltd.) that accepts an order from the orderer, and a third terminal (T3) to be operated by a third party (e.g., A Builder Corporation) different from both the orderer and the order recipient. The present server includes: a first receiver (1) configured to receive, from the first terminal, an order content indicating a content of the order; a second receiver (4) configured to receive, from the second terminal, acknowledgement information indicating acceptance of the order; a storage (M) configured to store therein the order content and the acknowledgement information; a creating unit (5) configured to create a written acknowledgement for the order, based on the order content and the acknowledgement information; and a viewing controller (6) configured to display the written acknowledgement on the third terminal, in which the viewing controller displays the written acknowledgement on the third terminal in such a manner that a part of the order content is invisible.

In the present server, the first receiver may receive the part of the order content from the first terminal and store the part of the order content in the storage, and the viewing controller may display the written acknowledgement on the third terminal in such a manner that the part of the order content stored in the storage is invisible.

In the present server, the second receiver may receive the part of the order content from the second terminal and store the part of the order content in the storage, and the viewing controller may display the written acknowledgement on the third terminal in such a manner that the part of the order content stored in the storage is invisible.

The present server may include an information selection unit configured to select the part of the order content from information contained in the written acknowledgement, in which the viewing controller may display the written acknowledgement on the third terminal in such a manner that the part of the order content selected by the information selection unit is invisible.

The present server is configured to be connected via a communication network (N) to a third terminal (T3) to be operated by a third party (e.g., A Builder Corporation) different from both an orderer (e.g., B Facilities Corporation) and an order recipient (e.g., C Gas Ltd.) that accepts an order from the orderer. The present server includes: a storage (M) configured to store therein an order content indicating a content of the order and an acknowledgement information indicating acceptance of the order; a creating unit (5) configured to create a written acknowledgement for the order, based on the order content and the acknowledgement information; and a viewing controller (6) configured to display the written acknowledgement on the third terminal, in which the viewing controller displays the written acknowledgement on the third terminal in such a manner that a part of the order content is invisible.

The present server may include a receiver configured to receive the part of the order content from a terminal to be operated by the orderer and store the part of the order content in the storage, in which the viewing controller may display the written acknowledgement on the third terminal in such a manner that the part of the order content stored in the storage is invisible.

The present server may include a receiver configured to receive the part of the order content from a terminal to be operated by the order recipient and store the part of the order content in the storage, in which the viewing controller may display the written acknowledgement on the third terminal in such a manner that the part of the order content stored in the storage is invisible.

The present server may include an information selection unit configured to select the part of the order content from information contained in the written acknowledgement, in which the viewing controller may display the written acknowledgement on the third terminal in such a manner that the part of the order content selected by the information selection unit is invisible.

Features of the Present Program

The present program causes a computer to function as the present server.

Features of the Present Method

The present method is a method that is performed by a server (SV) configured to be connected via a communication network (N) to each of a first terminal (T1) to be operated by an orderer (e.g., B Facilities Corporation), a second terminal (T2) to be operated by an order recipient (e.g., C Gas Ltd.) that accepts an order from the orderer, and a third terminal (T3) to be operated by a third party (e.g., A Builder Corporation) different from both the orderer and the order recipient, in which the server includes a storage (M). The present method includes steps to be performed by the server, the steps being: a first receiving step (S1) of receiving, from the first terminal, an order content indicating a content of the order; a storing step of storing the order content in the storage; a first creating step (S2) of creating a work order, based on the order content; a first viewing control step (S3) of displaying the work order on the second terminal; a second receiving step (S4) of receiving, from the second terminal, acknowledgement information indicating acceptance of the order; a second creating step (S5) of creating a written acknowledgement of the accepted order, based on the acknowledgement information; and a second viewing control step (S6) of displaying the written acknowledgment of the order on the third terminal, in which the server, in the second viewing control step, displays the written acknowledgment on the third terminal in such a manner that a part of the order content (e.g., order amount) is invisible.

The present method is a method that is performed by a server (SV) configured to be connected via a communication network (N) to each of a first terminal (T1) to be operated by an orderer (e.g., B Facilities Corporation), a second terminal (T2) to be operated by an order recipient (e.g., C Gas Ltd.) that accepts an order from the orderer, and a third terminal (T3) to be operated by a third party (e.g., A Builder Corporation) different from both the orderer and the order recipient, in which the server includes a storage (M). The present method includes steps to be performed by the server, the steps being: a first receiving step (S1) of receiving an order content indicating a content of the order from the first terminal and storing the order content in the storage; a second receiving step (S4) of receiving acknowledgement information indicating acceptance of the order from the second terminal and storing the acknowledgement information in the storage; a creating step (S5) of creating a written acknowledgement of the accepted order, based on the order content and the acknowledgement information; and a viewing control step (S6) of displaying the written acknowledgement on the third terminal, in which the server, in the viewing control step, displays the written acknowledgement on the third terminal in such a manner that a part of the order content is invisible.

The present method is a method that is performed by a server (SV) configured to be connected via a communication network (N) to a third terminal (T3) to be operated by a third party (e.g., A Builder Corporation) different from both an orderer (e.g., B Facilities Corporation) and an order recipient (e.g., C Gas Ltd.) that accepts an order from the orderer, in which the server includes a storage (M). The present method includes steps to be performed by the server, the steps being: a storing step (S1, S4) of storing, in the storage, an order content indicating a content of the order and acknowledgement information indicating acceptance of the order; a creating step (S5) of creating a written acknowledgement of the order, based on the order content and the acknowledgement information; and a viewing control step (S6) of displaying the written acknowledgement on the third terminal, in which the server, in the viewing control step, displays the written acknowledgement on the third terminal in such a manner that a part of the order content is invisible.

Features of the Subject Server, the Subject Program, and the Subject Method

The features of the subject server, the subject program, and the subject method described above will now be summarized.

Features of the Subject Server

The subject server is configured to be connected via a communication network (e.g., the Internet) to a third terminal (e.g., third terminal T3) to be operated by a third party (e.g., A Builder Corporation) different from both a provider (e.g., B Facilities Corporation) and a recipient (e.g., C Gas Ltd.) that accepts information (e.g., order content) provided by the provider. The subject server includes: a storage (e.g., storage M) configured to store therein the provided information; a creating unit (e.g., order-acknowledgment creating unit 5) configured to create viewable information (e.g., written acknowledgement), based on the provided information; and a viewing controller (e.g., order-acknowledgment viewing controller 6) configured to display the viewable information on the third terminal, in which the viewable information contains the provided information, and the viewing controller displays the viewable information on the third terminal in such a manner that a part of the provided information (e.g., order amount) is invisible.

The subject server may include a receiver configured to receive the part of the provided information from a terminal to be operated by the provider and store the part of the provided information in the storage, in which the viewing controller may display the viewable information on the third terminal in such a manner that the part of the provided information stored in the storage is invisible.

The subject server may include a receiver configured to receive the part of the provided information from a terminal to be operated by the recipient and store the part of the provided information in the storage, in which the viewing controller may display the viewable information on the third terminal in such a manner that the part of the provided information stored in the storage is invisible.

The subject server may include an information selection unit configured to select the part of the provided information from information contained in the viewable information, in which the viewing controller may display the viewable information on the third terminal in such a manner that the part of the provided information selected by the information selection unit is invisible.

The subject server may include a masking unit configured to mask the part of the provided information, in which the viewing controller may display the viewable information on the third terminal in such a manner that the part of the provided information masked by the masking unit is invisible.

The subject server may include an erasing unit configured to erase the part of the provided information, in which the viewing controller may display the viewable information on the third terminal in such a manner that the part of the provided information erased by the erasing unit is invisible.

The subject server may include an encryption unit configured to encrypt the part of the provided information, in which the viewing controller may display the viewable information on the third terminal in such a manner that the part of the provided information encrypted by the encryption unit is invisible.

Features of the Subject Program

The subject program causes a computer to function as the subject server.

Features of the Subject Method

The subject method is a method that is performed by a server (e.g., SV) configured to be connected via a communication network (e.g., the Internet) to a third terminal (e.g., third terminal T3) to be operated by a third party (e.g., A Builder Corporation) different from both a provider (e.g., B Facilities Corporation) and a recipient (e.g., C Gas Ltd.) that accepts information (e.g., order contents) provided by the provider, in which the server includes a storage (e.g., storage M) configured to store therein the provided information. The subject method includes steps to be performed by the server, the steps being: a creating step (e.g., S5) of creating viewable information (e.g., written acknowledgement), based on the provided information; and a viewing control step (e.g., S6) of displaying the viewable information on the third terminal, in which the viewable information contains the provided information, and the server, in the viewing control step, displays the viewable information on the third terminal in such a manner that a part of the provided information (e.g., order amount) is invisible.

What is claimed is:

1. An order management server configured to be connected via a communication network to each of a first terminal that is to be operated by an orderer, a second terminal that is to be operated by an order recipient that accepts an order from the orderer, and a third terminal that is to be operated by a third party different from both the orderer and the order recipient, the order management server comprising:

a programmable computer that includes one or more processors communicatively connected to a storage, the storage including a computer-readable storage medium that includes a non-transitory storage medium and, stored in the non-transitory storage medium, a program comprising processor-executable instructions that when executed cause the computer's one or more processors to perform as functional blocks of the order management server, comprising:

a first receiver functional block configured to receive, via the communication network from the first terminal, an order content indicating a content of an order and to store the order content in an order information database in the storage, as a received order content;

a first creating unit functional block configured to access the storage and create a work order, based on the received order content stored in the order information database, and to store the work order in the storage as a stored work order;

a first viewing controller functional block configured to control display of the stored work order so as to be viewed, via the communication network, from the second terminal;

a second receiver functional block configured to receive, from the second terminal via the communication network an acknowledgement information indicating acceptance of the order, and to store the received acknowledgement information in the storage;

a second creating unit functional block configured to access the received acknowledgement information in the storage, create a written order acknowledgement for the accepted order, based on information comprising the received acknowledgement information, and store the written order acknowledgement in the storage; and a second viewing controller functional block configured to control display of the written order acknowledgement in so as to be viewed from the third terminal via the communication network, a manner that renders a part of the order content visible and a part of the order content invisible from view of the written order acknowledgement on the third terminal.

2. The order management server according to claim 1, wherein the second creating unit functional block is further configured to also use, in operations of creating the written order acknowledgement, the received order content.

3. The order management server according to claim 2, wherein
the order content contains an order amount that is a payment for the order, and
the second viewing controller functional block is further configured to control display of the written order acknowledgement on the third terminal in such a manner that the part of the written order acknowledgement that is invisible from view on the third terminal includes the order amount.

4. The order management server according to claim 3, wherein
the second receiver functional block is further configured to receive, from the second terminal via the communication network, as a received signature, a signature of the order recipient as at least a portion of the acknowledgement information,
the second creating unit functional block is further configured to create the written order acknowledgement also using the received signature, and
the second viewing controller functional block is further configured to display the written order acknowledgement on the third terminal in such a manner that the received signature is visible.

5. The order management server according to claim 4, wherein the second viewing controller functional block is further configured to display the written acknowledgement on the first terminal in such a manner that all of the order contents are visible.

6. The order management server according to claim 5, wherein
the storage is further configured to store a secondary acknowledgement content indicating a content of a secondary acknowledgement between the order recipient and a secondary contractor to which the order recipient places the order,
the server further comprises, stored in the non-transitory storage medium, a third viewing controller functional block configured to display a part of the secondary acknowledgement content on the first terminal,
the secondary acknowledgement content contains a secondary order amount that is a payment for the secondary acknowledgement, and
the third viewing controller functional block is configured to display the secondary acknowledgement content on the first terminal in such a manner that the secondary order amount is invisible.

7. A non-transitory storage medium storing an order management program executable on a computer to cause the computer to function as the order management server according to claim 1.

8. A computer-based order management method that is performed by a server configured to be connected via a communication network to each of a first terminal that is to be operated by an orderer, a second terminal that is to be operated by an order recipient that accepts an order from the orderer, and a third terminal that is to be operated by a third party different from both the orderer and the order recipient, the server including a one or more processors communicatively connected to storage, the storage including a computer-readable storage medium that includes a non-transitory storage medium and, stored in the non-transitory storage medium, a program comprising processor-executable instructions that when executed cause the computer's one or more processers to perform the method comprising steps performed by the server, the steps being:

a first receiving step of receiving, via the communication network from the first terminal, an order content indicating a content of the order;

a storing step of storing the order content as a received order content in an order information database in the storage;

a first creating step of accessing the order information database, creating a work order, based on the received order content stored in the order information database, and storing the work order in the storage;

a first viewing control step of allowing the second terminal to access, via the communication network, the work order in the storage and to display the work order on the second terminal;

a second receiving step of receiving, from the second terminal, an acknowledgement information indicating acceptance of the order, and storing the acknowledgement information in the storage, as a received acknowledgement information;

a second creating step of a written order acknowledgement of the accepted order, based on information comprising the received acknowledgement information in the storage, and storing the written order acknowledgement in the storage; and a second viewing control step of displaying, via the communication network, the written order acknowledgement on the third terminal, wherein
the server, in the second viewing control step, displays the written order acknowledgement, via the communication network, on the third terminal in such a manner that a part of the order content is visible and a part of the order content is invisible.

* * * * *